United States Patent [19]
Rasmusson

[11] Patent Number: 5,346,173
[45] Date of Patent: Sep. 13, 1994

[54] ACTUATOR
[75] Inventor: Björn Rasmusson, Vintrosa, Sweden
[73] Assignee: Ingenjorsfirma Rason Aktiebolag, Orebro, Sweden
[21] Appl. No.: 128,153
[22] Filed: Sep. 29, 1993
[30] Foreign Application Priority Data
  Oct. 16, 1992 [EP] European Pat. Off. .......... 9203037-8
[51] Int. Cl.$^5$ ............................................. F16K 31/12
[52] U.S. Cl. .................................... 251/58; 251/248; 251/250
[58] Field of Search ........................ 251/58, 248, 250
[56] References Cited
U.S. PATENT DOCUMENTS

| | | | |
|---|---|---|---|
| 3,104,862 | 9/1963 | Pearson et al. ........................ | 251/58 |
| 3,107,080 | 10/1963 | Priese ................................... | 251/250 |
| 4,260,128 | 4/1981 | Tito ...................................... | 251/58 |
| 4,647,003 | 3/1987 | Hilpert et al. ........................ | 251/250 |

Primary Examiner—A. Michael Chambers
Attorney, Agent, or Firm—Michael D. Bednarek

[57] ABSTRACT

The present invention relates to an actuator for turning a shaft (11) to a limited degree, e.g. the shaft of a butterfly valve or the like, the actuator comprising a housing (2) having a cylindrical chamber (6), inlets and outlets (7, 8) for a pressure fluid to the cylindrical chamber, a piston (9) in the cylindrical chamber, which can be displaced in the cylindrical chamber by means of a pressure fluid and is provided with a rack (10) with a toothed segment (27) cooperating with a gear ring segment (22), fixedly mounted on said shaft (11), which extends right through the cylindrical chamber (6) and through the wall of the housing (2). The characteristic feature of the invention is that the toothed segment (27) is disposed at the bottom of a groove (26) in the rack (10), that said gear ring segment (22) has a breadth in the axial direction, which corresponds to the breadth of said groove, and that said gear ring segment is provided in the groove (26) to mesh with the toothed segment, the shaft (11) in this way being fixed in the axial direction in the housing (2).

16 Claims, 1 Drawing Sheet

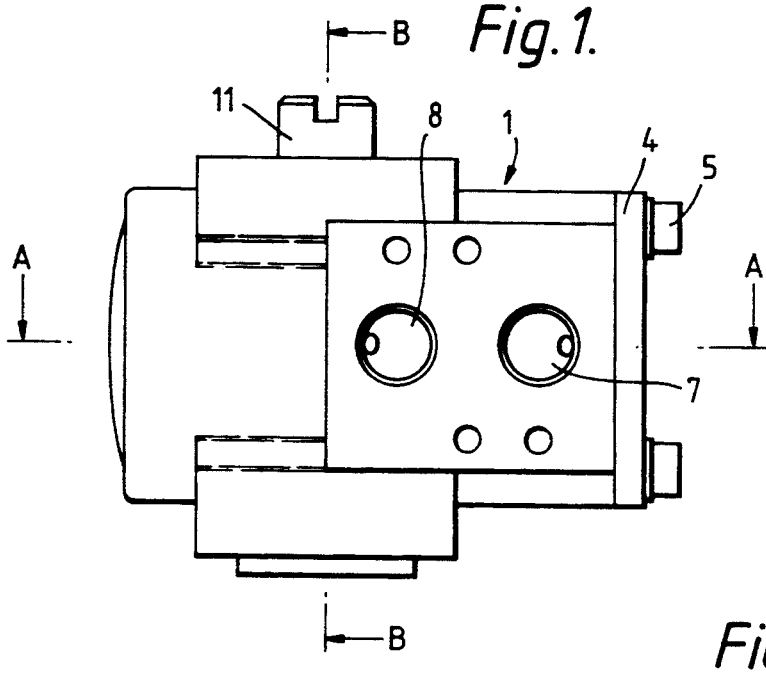
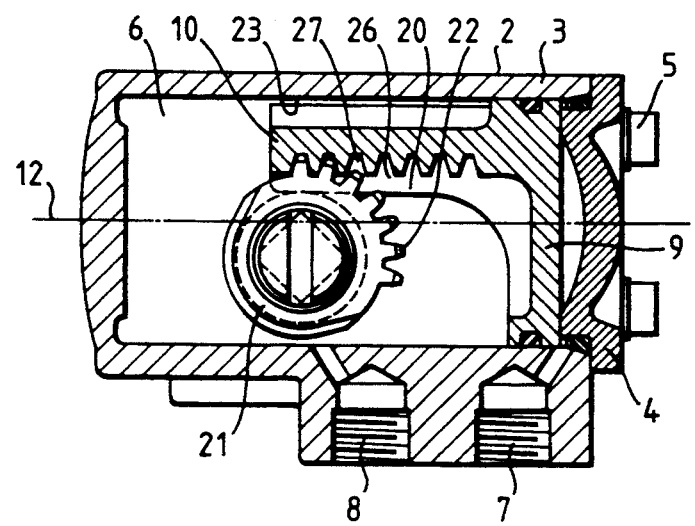
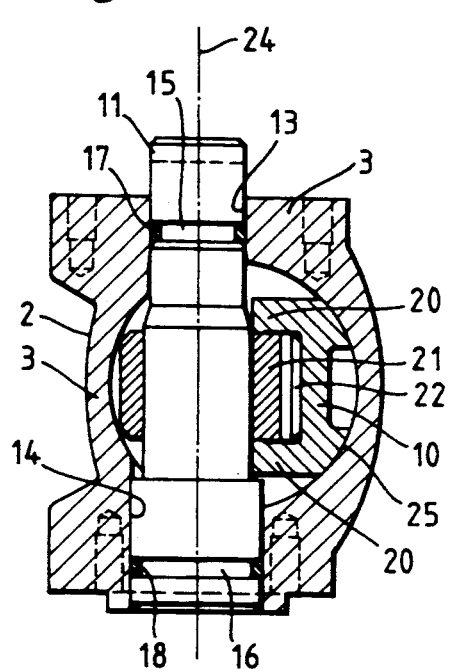

ACTUATOR

TECHNICAL FIELD

The present invention relates to an actuator for turning a shaft to a limited degree, e.g. the shaft of a butterfly valve or the like, the actuator comprising a housing having a cylindrical chamber, inlets and outlets for a pressure fluid to the cylindrical chamber, a piston in the cylindrical chamber, which can be displaced in the cylindrical chamber by means of a pressure fluid and is provided with a rack with a toothed segment cooperating with a gear ring segment, fixedly mounted on said shaft, which extends right through the cylindrical chamber and through the wall of the housing.

BACKGROUND ART

Various embodiments of actuators of the type described above are known in the art. Reference can be made to e.g. the designs described in the documents DE 25 18 681, DK 156 745, SE 379 404 and U.S. Pat. No. 3,498,187. Typical features of these constructions are that they are comparatively complicated and require quite a number of components and machining processes, which makes the product expensive. Nevertheless, all necessary details have not been shown in these patent documents, e.g. radially directed grooves in the bearings for the shaft in order to secure the shaft, details which are conventional but which require expensive machining processes. This concerns at least the constructions described in DE 25 18 681, DK 156 745 and U.S. Pat. No. 3,498,187. A special feature of the construction according to SE 379 404 is that the piston area is relatively small as compared to the piston stroke, because the teeth of the gear ring segment are rods in a groove, with which the rack meshes. The torsional moment, which the actuator can generate, is consequently relatively small in relation to the overall dimensions of the device.

BRIEF DISCLOSURE OF THE INVENTION

The main object of the present invention is to provide an actuator having a very simple design, which means few components and a small amount of machining operations. At the same time the actuator must be able to generate a large torsional moment in spite of its simple design and in spite of its small overall dimensions, in order to be able to replace considerably more complicated and expensive and in certain cases larger actuators. These and other objects can be achieved by the present invention which is characterized by what is set forth in the appending patent claims.

Further characterizing features and aspects of the invention are evident from the following description of a preferred embodiment.

BRIEF DESCRIPTION OF THE DRAWINGS

In the following description of a preferred embodiment, reference will be made to the accompanying drawings, in which:

FIG. 1 is a side elevation of the actuator according to the preferred embodiment;

FIG. 2 shows a longitudinal horizontal section through the actuator along line A—A in FIG. 1; and FIG. 3 shows the actuator in a vertical section, which coincides with the centre line of the rotational shaft along line B—B in FIG. 1.

DESCRIPTION OF PREFERRED EMBODIMENT

Referring to the drawings reference numeral 1 designates an actuator. The main components are a housing 2 comprising a main section 3, which at its one end is provided with a closure member 4, fastened with screws 5. In main section 3 of housing 2 there is a cylindrical chamber 6 having inlet and outlet conduits 7, 8 for a pressure fluid. In the shown embodiment the pressure fluid is compressed air.

In cylindrical chamber 6 there is a piston 9, which in a conventional way can be displaced to and fro in chamber 6, influenced by the pressure fluid. A rack 10 is mounted on piston 9 and its design will be explained more in detail below.

The shaft intended to be rotated by means of actuator 1 is designated 11. It is mounted eccentricly through chamber 6 and through the walls of housing 2, i.e. at a distance from a centre line 12 through cylindrical chamber 6. The bearings of shaft 11 are completely smooth borings 13, 14, i.e. without any annular grooves or the like, for sealing rings or the like in order to axially hold shaft 11. In the design according to the present invention no such grooves and rings are needed, as will be explained below. However, there are two annular grooves in shaft 11, which are easily made with a turning-lathe. In these grooves 15, 16 two O-rings 17, 18 are mounted for sealing purposes. On shaft 11 a gear ring 21 with a gear ring segment 22 is mounted by means of a press fit or by means of screws or other types of fastening means in order to fix ring 21 on shaft 11. Gear ring segment 22 extends in the shown embodiment over an angle, which is slightly larger than 90°, which is sufficient for the operation of e.g. a butterfly valve, a ball valve, a calotte valve or the like, the valve body being turned 90° between a completely open and a completely closed position and vice versa.

Rack 10 consists of a projection, integrated with piston 9. It runs parallel and adjacent to wall 23 of main section 3 of housing 2, which wall is disposed on the opposite side of centre line 12 in relation to centre line 24 of shaft 11. Two cylindrical surfaces 25 will slide against cylindrical wall 23.

On that side of rack 10 which faces centre line 12 of the cylindrical chamber, rack 10 is provided with a longitudinal groove 26, which has the same breadth as the size of the extension of gear ring 21 in the axial direction of shaft 11. At the bottom of groove 26 there is a toothed segment 27. Gear ring segment 22 is inserted into groove 26 and meshes with toothed segment 27. Through the insertion of gear ring segment 22 in groove 26, gear ring 21 is fixed and consequently also shaft 11, which is fastened to gear ring 21, in the axial direction of shaft 11 in housing 2. In this way the need to use additional elements in order to axially fix shaft 11 is eliminated.

Portions 20 of rack 10 engages shaft 11 on both sides of groove 26, which contributes to an even better and more reliable control of piston 9.

The length of toothed segment 27 according to the embodiment approximately equals the diameter of piston 9.

I claim:

1. An actuator for turning a shaft (11) to a limited degree, e.g. the shaft of a butterfly valve or the like, the actuator comprising a housing (2) having a cylindrical chamber (6), inlets and outlets (7, 8) for a pressure fluid to the cylindrical chamber, a piston (9) in the cylindrical chamber, which can be displaced in the cylindrical chamber by means of a pressure fluid and is provided with a rack (10) with a toothed segment (27) cooperating with a gear ring segment (22), fixedly mounted on said shaft (11), which extends right through the cylindrical chamber (6) and through the wall of the housing (2), characterized in that said toothed segment (27) is disposed at the bottom of a groove (26) in the rack (10), that said gear ring segment (22) has a breadth in the axial direction, which corresponds to the breadth of said groove, and that said gear ring segment is provided in the groove (26) to mesh with the toothed segment, the shaft (11) in this way being fixed in the axial direction in the housing (2).

2. An actuator according to claim 1, characterized in that said shaft extends eccentrically through the cylindrical chamber.

3. An actuator according to claim 2, characterized in that said gear ring segment (22) is a portion of a ring, which is fixed to the shaft (11).

4. An actuator according to claim 2, characterized in that said rack (10) extends as a projection on said piston (9) between said shaft (11) and the side (23) of the cylindrical chamber, which includes a plane coinciding with the centre line (12) of the cylindrical chamber and perpendicular to the shaft (11) and which is located on the opposite side of the centre line (12) of the cylindrical chamber in relation to the centre line (24) of the shaft (11), and that said rack on the side which faces the wall of the cylindrical chamber has at least one cylindrical sliding surface (25), which contacts the wall of the cylinder chamber.

5. An actuator according to claim 4, characterized in that said rack on the opposite side, on both sides of said groove, has portions (20), which are journal led to the shaft (11).

6. An actuator according to claim 5, characterized in that said gear ring segment (22) is a portion of a ring, which is fixed to the shaft (11).

7. An actuator according to claim 4, characterized in that said gear ring segment (22) is a portion of a ring, which is fixed to the shaft (11).

8. An actuator according to claim 1, characterized in that the axial bearings of the shaft (11) through the housing (2) are cylindrical borings (13, 14) without any radially recessed annular grooves.

9. An actuator according to claim 1, characterized in that said gear ring segment (22) is a portion of a ring, which is fixed to the shaft (11).

10. An actuator according to claim 8, characterized in that said gear ring segment (22) is a portion of a ring, which is fixed to the shaft (11).

11. An actuator for turning a shaft to a limited degree, the actuator comprising:
   a housing comprising a chamber at least two parts for supplying pressurized fluid to and from the chamber;
   a piston located within the chamber and slidable in a predetermined direction in response to the force of pressurized fluid;
   a rack movable with the piston, the rack being formed with a groove having side walls spaced apart to define a groove width and a bottom, and a toothed segment formed in the bottom of the groove, the groove and toothed segment extending in the direction of piston sliding;
   the shaft having a longitudinal axis and extending through the housing;
   a gear element secured to the shaft for movement therewith;
   the gear element comprising a plurality of teeth enmeshed with the toothed segment at the bottom of the groove in the rack, the gear element having a predetermined width that correspond to the width of the groove so that the side walls of the groove restrain the gear element and the shaft secured thereto from movement in the direction of the longitudinal axis of the shaft.

12. An actuator according to claim 11, wherein the piston slides in a cylindrical chamber formed in the housing and the shaft extends eccentrically through the housing.

13. An actuator according to claim 12, wherein the rack extends as a projection of the piston between said shaft and the side (23) of the cylindrical chamber, which includes a plane coinciding with the centre line (12) of the cylindrical chamber and perpendicular to the shaft (11) and which is located on the opposite side of the centre line (12) of the cylindrical chamber in relation to the centre line (24) of the shaft (11), and that said rack on the side which faces the wall of the cylindrical chamber has at least one cylindrical sliding surface (25), which contacts the wall of the cylinder chamber.

14. An actuator according to claim 13, characterized in that said rack on the opposite side, on both sides of said groove, has portions (20), which are journalled to the shaft (11).

15. An actuator according to claim 11, characterized in that the axial bearing of the shaft (11) through the housing (2) are cylindrical borings (13, 14) without any radially recessed annual grooves.

16. An actuator according to claim 11, characterized in that said gear element is a gear ring segment (22) of which is fixed to the shaft (11).

* * * * *

UNITED STATES PATENT AND TRADEMARK OFFICE
CERTIFICATE OF CORRECTION

PATENT NO. : 5,346,173
DATED : September 13, 1994
INVENTOR(S) : Bjorn RASMUSSON

It is certified that error appears in the above—identified patent and that said Letters Patent is hereby corrected as shown below:

Title page, item [30]

Swedish Patent No. 9203037-8 has erroneously been identified as European Patent No. 9203037-8 in the "Foreign Application Priority Data" appearing on the first page of the patent.

Signed and Sealed this

Seventh Day of March, 1995

Attest:

BRUCE LEHMAN

Attesting Officer     Commissioner of Patents and Trademarks